(12) United States Patent
True et al.

(10) Patent No.: US 9,068,104 B2
(45) Date of Patent: Jun. 30, 2015

(54) DUAL CURING COMPOSITION AND USE THEREOF

(75) Inventors: Markus True, Augsburg (DE); Dietmar Dengler, Seestall (DE); Robert Born, München (DE)

(73) Assignee: Delo Industrie Klebstoffe GMBH & Co. KGAA, Windach (DE)

( * ) Notice: Subject to any disclaimer, the term of this patent is extended or adjusted under 35 U.S.C. 154(b) by 7 days.

(21) Appl. No.: 13/582,136

(22) PCT Filed: Mar. 3, 2011

(86) PCT No.: PCT/EP2011/001052
§ 371 (c)(1),
(2), (4) Date: Aug. 31, 2012

(87) PCT Pub. No.: WO2011/110305
PCT Pub. Date: Sep. 15, 2011

(65) Prior Publication Data
US 2012/0329897 A1    Dec. 27, 2012

(30) Foreign Application Priority Data
Mar. 8, 2010   (DE) .......................... 10 2010 010 598

(51) Int. Cl.
*C09J 175/16* (2006.01)
*C08L 101/10* (2006.01)

(52) U.S. Cl.
CPC .............. *C09J 175/16* (2013.01); *C08L 101/10* (2013.01)

(58) Field of Classification Search
CPC .............................. C09J 175/16; C08L 101/10

USPC ...................................................... 522/26, 28
See application file for complete search history.

(56) References Cited

U.S. PATENT DOCUMENTS

| | | | |
|---|---|---|---|
| 2004/0077778 A1* | 4/2004 | Hazan et al. | 524/589 |
| 2004/0181007 A1* | 9/2004 | Acevedo et al. | 524/589 |
| 2007/0213493 A1* | 9/2007 | Jacobine et al. | 528/28 |
| 2009/0186552 A1 | 7/2009 | Shinya et al. | |
| 2009/0296033 A1 | 12/2009 | Shinya et al. | |
| 2009/0299017 A1 | 12/2009 | Tsuno et al. | |
| 2012/0040191 A1* | 2/2012 | Kohl et al. | 428/429 |

FOREIGN PATENT DOCUMENTS

| | | |
|---|---|---|
| CN | 101203580 A | 6/2008 |
| DE | 10351804 A1 | 6/2005 |
| DE | 102005029282 A1 | 12/2006 |
| DE | 102007042948 A1 | 3/2009 |
| DE | 102007060536 A1 | 6/2009 |
| DE | 102008002163 A1 | 12/2009 |

(Continued)

OTHER PUBLICATIONS

Kaneka, "Kaneka MS Polymer", p. 1 (Apr. 2014).*

*Primary Examiner* — Mark Eashoo
*Assistant Examiner* — Jessica Roswell
(74) *Attorney, Agent, or Firm* — McNees Wallace & Nurick LLC

(57) ABSTRACT

The invention relates to combined radiation- and moisture-curing compounds, which are characterized in particular by rapid curing by means of moisture. The compounds can be used as adhesives, coatings or potting materials. The use of the compounds according to the invention is particularly preferred for filling electro-optical components.

16 Claims, 3 Drawing Sheets

(56) References Cited

FOREIGN PATENT DOCUMENTS

| EP | 0934956 | A1 | 8/1999 |
| EP | 1209212 | A1 | 5/2002 |
| EP | 2051227 | A1 | 4/2009 |
| EP | 2133855 | A1 | 12/2009 |
| EP | 2133856 | A1 | 12/2009 |
| EP | 2136348 | A1 | 12/2009 |
| WO | 2006014786 | A1 | 2/2006 |
| WO | 2007108895 | A1 | 9/2007 |
| WO | WO 2010/108716 | * | 6/2010 | ............ C09J 143/04 |

* cited by examiner

DUAL CURING COMPOSITION AND USE THEREOF

BACKGROUND OF THE INVENTION

The invention refers to a single-component composition which is liquid at room temperature and can be cross-linked by actinic radiation and by moisture. The composition in accordance with the invention can be used as an adhesive, coating material or filling material. The composition is preferably used for filling electro-optical components.

Compositions that can be cross-linked using actinic radiation are well known. Such compositions usually contain at least one photoinitiator for radical polymerization, as well as radically cross-linkable monomers and/or pre-polymers and, optionally, other auxiliary substances. The photoinitiator is broken down by the radiation, for example by visible or UV light, into reactive radicals with which the polymerization or cross-linking of the monomers is initiated. As the radical polymerization takes place at a very high reaction speed, both storage-stable as well as very rapidly curing compositions can be provided. A disadvantage of the radiation-curing compositions is, however, that the material does not cure in shadow zones.

DE 10 2008 002163 A1 describes hot-melt adhesives containing alpha-alkoxysilanes which can be cured by the exposure to moisture. A disadvantage here is that the curing speed of these compositions is not sufficient to support rapid, automated production processes. The moisture curing is still not complete after more than one week. Curing times within a range of a few seconds cannot be achieved with these compositions.

DE 10 2007 042948 A1 refers to polymers produced by the grafting of heteroatom-substituted silanes in the alpha position, and their cross-linking by water. These polymers are also only fully cured after several hours, and are therefore not suitable for processes which require rapid initial curing.

DE 10351804 A1 refers to a process to increase the elasticity of moisture-cured elastomers made of alkoxy-crosslinking single-component compositions. These compositions only start to form a skin after many minutes in contact with moisture, and are therefore also not suitable for rapid curing processes.

DE 10 2005 029282 A1 discloses silane-crosslinking adhesive or sealing compositions which, alongside a silane-crosslinking polymer, also contain special alpha-silanes with at least two ethoxy groups. A skin only forms on these products after several minutes, so that these compositions cannot be used for rapid, fully automated processes.

DE 10 2007 060536 A1 refers to coating agents for wood and synthetic surfaces. The coating agents contain a polyolefin which has at least two alkoxysilane groups, compounds with (meth)acrylic groups with up to ten radiation-reactive groups, as well as catalysts and photoinitiators. The coating agents are solid at room temperature and can be cross-linked by actinic radiation and moisture. A disadvantage is that the compositions, which are solid at room temperature, cannot be easily applied over the surface of a substrate by simple dosing methods, and the end-capped polyolefins have a low tolerance at room temperature to components of the formulation used for radiation hardening.

EP 0934956 A1 describes curable formulations which contain a saturated hydrocarbon polymer which contains at least one group cross-linking to form siloxane, a silane-curing reagent and a component which can be polymerized in the presence of atmospheric oxygen or with the aid of a photoinitiator. A disadvantage is the very slow curing under moist conditions. Radiation curing is only used to achieve a more rapid initial hardness of the otherwise purely moisture-curing composition.

US 2009/0299017 A1 describes single-component, moisture-curing compositions which have improved adhesive properties and can be easily coated after the composition has cured. The compositions described are not suitable for rapid, automated processes due to their slow curing.

EP 2051227 A1 describes displays which have a cured resin between the display part and the protective layer.

EP 2133855 A1 and EP 2133856 A1 disclose displays with a protective layer which is fixed with the aid of a radiation-curable composition.

EP 2136348 A1 discloses a display which has a cured material between the display part and the protective layer.

US 2009/0186552 A1 describes radiation- and heat-curable resins to connect a protective layer with a display part in a display.

US 2009/0296033 A1 discloses displays which contain a curable resin between the protective layer and the display part.

It is, therefore, still an object to provide storage-stable compositions which can be processed in liquid form and then cured very rapidly while ensuring that they are fully cured throughout the whole volume of the composition. In particular, the compositions need to meet the requirements for automated production processes, in particular in the production of electro-optical components.

This object is solved in accordance with the invention by a single-component dual curing composition according to Claim 1.

Advantageous embodiments of the compositions according to the invention are indicated in the sub-claims.

A further object of the invention is the use of the compositions according to the invention as an adhesive or sealant for bonding, filling, sealing and coating of substrates, in particular its use to fill electro-optical components such as displays.

SUMMARY OF THE INVENTION

The invention provides a single-component, dual curing composition which is liquid at room temperature and can be cross-linked by actinic radiation and by moisture, wherein the composition contains at least one compound comprising one to four alpha-(alkoxy)silane groups, but with the exception of polyolefins substituted with alpha-(alkoxy)silane groups.

Alpha-(alkoxy)silane compounds within the meaning of the invention are compounds which contain one or more (alkoxy)silane groups in an alpha position to a heteroatom such as oxygen, sulfur or nitrogen.

Preference is given to alpha-(alkoxy)silane compounds in which the alkoxysilane group is separated from the heteroatom by a substituted or unsubstituted methylene group.

With the compositions in accordance with the invention it is possible to achieve both a very rapid radiation-curing and a rapid hardening by exposure to moisture so that, overall, rapid curing processes with a high initial hardness can be guaranteed. This means that the compositions in accordance with the invention can be used advantageously in automated production processes. In particular, the compositions in accordance with the invention are suitable for applications in which large areas are accessible by radiation leaving smaller shadow zones in which a purely radiation-curing composition will not cure. In these shadow zones the compositions in accordance with the invention are cured in sufficient time by the exposure to moisture. In a special embodiment the curable compositions are used for filling and full-surface connection of the parts and layers of a display through which the radiation passes.

The compositions in accordance with the invention are also stable in storage as no polyolefin-based alkoxysilanes are used. Polyolefins in liquid formulations are not compatible with the other components of the radiation-curing compositions and tend to separate due to the poor solubility in the radically polymerizable monomers and pre-polymers at room temperature. Particularly for use in automated processes for the production of electro-optical components, however, it is necessary to use liquid and thus easily dosable compositions.

The composition in accordance with the invention comprises at least one alpha-(alkoxy)silane compound along with at least one photoinitiator, at least one radiation-curing compound and a catalyst for the moisture curing of the alpha-(alkoxy)silane compound.

Radiation-curing compounds within the meaning of the invention are compounds which are irreversibly cross-linked by radical polymerization on exposure to actinic radiation such as electron radiation, UV radiation and visible light in the presence of a photoinitiator.

The radiation-curing compound preferably comprises monomers and/or prepolymers with 1 to 5 radiation-induced, radically polymerizable groups, and is preferably selected from the group consisting of (meth)acrylic esters, (meth) acrylamides, vinyl ethers and bismaleimides. Further preferred radically polymerizable compounds are pre-polymers on the basis of polyols or polyurethane, which are substituted with radiation-curing groups such as (meth)acrylic esters. In the following the term "(meth)acrylic" stands for both acrylic and methacrylic groups.

The photoinitiators can be commercially available compounds which break down into reactive radicals on exposure to electron radiation, UV radiation and/or visible light. Preference is given to UV photoinitiators.

Both acids and bases can be used as catalysts to accelerate the silane cross-linking on exposure to moisture.

According to the invention the alpha-(alkoxy)silane compound and the radiation-curing compound are present in the composition as separate components.

The composition in accordance with the invention preferably comprises 60 to 99.89 parts by weight of the alpha-(alkoxy)silane compound in sum with the radiation-induced, radically polymerizable compound, 0.01 to 20 parts by weight of the photoinitiator and 0.001 to 20 parts by weight of the catalyst, with reference to 100 parts by weight of the aforementioned components.

It is particularly preferred that the composition in accordance with the invention comprises (A) 5 to 80 parts by weight of at least one alpha-(alkoxy)silane compound, (B) 5 to 80 parts by weight of at least one radically polymerizable compound, preferably as separate components, (C) 0.01 to 20 parts by weight of the photoinitiator and (D) 0.001 to 20 parts by weight of the catalyst, each with reference to 100 parts by weight of the aforementioned components (A) to (D).

The composition in accordance with the invention can also comprise further modifiers as well as silane-based modifiers which are not alpha-(alkoxy)silane compounds.

Preferably the composition in accordance with the invention is free of solvents.

It is particularly preferred that the composition in accordance with the invention comprises (A) 5 to 80 parts by weight of at least one alpha-(alkoxy)silane compound, (B) 5 to 80 parts by weight of at least one radiation-curing compound, (C) 0.01 to 20 parts by weight of at least one photoinitiator for the radical polymerization, (D) 0.001 to 20 parts by weight of at least one catalyst for the silane cross-linking, (E) 0 to 70 parts by weight of the further modifiers and (F) 0 to 30 parts by weight of the silane-based modifiers, whereby the sum of all parts by weight is 100.

Component (A): Alpha-(alkoxy)silane Compounds

According to a preferred embodiment of the invention the alpha-(alkoxy)silane compound corresponds to the following formula (I):

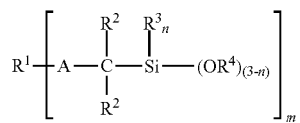

wherein $R^1$ is a residue with a valency of one to four selected from the group consisting of (i) linear or branched, saturated or unsaturated alkyl residues having 1 to 8 C-atoms, optionally interrupted by 1 to 3 heteroatoms, (ii) saturated or unsaturated cycloalkyl residues having 3 to 9 C-atoms, optionally interrupted by 1 to 3 heteroatoms, (iii) aromatic residues with 5 to 10 C-atoms, (iv) polyether, polyamide, polyester, polycarbonate, polyurethane, polyurea and polyacrylate, wherein $R^1$ can be unsubstituted or substituted but does not carry any radiation-curing groups, each $R^2$ is, independently, a monovalent residue selected from the group consisting of hydrogen, linear, branched, cyclic, saturated, unsaturated and aromatic hydrocarbons, which optionally can be halogen-substituted and/or interrupted by 1 to 3 heteroatoms, each $R^3$ is, independently, a monovalent residue selected from the group consisting of linear, branched, cyclic, saturated, unsaturated and aromatic hydrocarbons, which optionally can be halogen-substituted or interrupted by 1 to 3 heteroatoms, each $R^4$ is, independently, a monovalent residue selected from the group consisting of hydrogen, linear, branched, cyclic, saturated, unsaturated and aromatic hydrocarbons which can be optionally halogen-substituted or interrupted by 1 to 3 heteroatoms, A is a heteroatom-containing residue with a valency of 2 or 3 which is bound by a heteroatom to the group $-CR^2_2-SiR^3_n(OR^4)_{(3-n)}$, m equals 1 to 4, preferably 2 or 3, and n equals 0 to 2.

The residue $R^1$ denotes preferably a polymer backbone of polyether, polyester, a polycarbonate, polyurethane, polyamide or polyurea which are compatible with the other components of the composition in accordance with the invention due to their polarity. Polyolefins and higher molecular hydrocarbons with more than 10 C-atoms are not suitable and expressly excluded.

The substituents on the residue $R^1$ preferably comprise halogen-substituents as well as oxo, hydroxy, alkoxy, aryloxy, acyloxy, sulfonato, sulfato, sulfinato, amino, alkylamino, dialkylamino, acylamino, imido, sulfonamido, imino, mercapto, alkylthio or arylthio substituents.

$R^1$ is especially preferably a polyethylene glycol or polypropylene glycol residue.

The heteroatom-containing residue A is preferably a heteroatom-containing bivalent residue, for example $-O-$, $-S-$, $-N(R)-$, $-C(O)-O-$, $-O-C(O)-O-$, $-O-C(O)-O-N(R)-$, $-N(R)-C(O)-O-$, $-S(O)-$, $-S(O)_2-$, $-S(O)-O-$, $-S(O)_2-O-$, $-O-S(O)_2-O-$, $-C(O)-N(R)-$, $-S(O)_2-N(R)-$, —S(O)₂—N[C(O)R]—, —O—S(O)₂—N(R)—, —N(R)—S(O)₂—O—, —P(O)(OR)—O—, —O—P(O)(OR)—, —O—P(O)(OR)—O—, —P(O)(OR)—N(R)—, —N(R)—P(O)(OR)—, —O—P(O)(OR)—N(R)—, —N(R)—P(O)(OR)—O—, —N[C(O)R]—, —N=C(R)—O—, —C(R)=N—O—, —C(O)—N[C(O)R]—, —N[S(O)₂R']—, —C(O)—N[S(O)₂R']— or —N[P(O)R"₂]—, wherein R denotes hydrogen or optionally substituted $C_1$-$C_{20}$-Alkyl- or $C_6$-$C_{20}$ aryl residues, R' denotes an optionally substituted $C_1$-$C_{20}$ alkyl- or $C_6$-$C_{20}$ aryl residue, and R" denotes an optionally substituted $C_1$-$C_{20}$ alkyl-, $C_6$-$C_{20}$ aryl-, $C_1$-$C_{20}$ alkoxy or $C_6$-$C_{20}$ aryloxy residue.

It is particularly preferred that A in the general formula (I) is an oxygen or nitrogen atom or a carboxy, carbamate, carbonate, ureido, urethane or sulfonate bond.

$R^2$ is preferably hydrogen. $R^3$ is preferably $C_1$-$C_6$ alkyl, in particular methyl, ethyl or phenyl.

The residue $R^4$ in the general formula (I) is preferably a methyl or ethyl group. Preferably, n is equal to 0 or 1.

According to a further preferred embodiment, the residue $R^2$ is hydrogen, $R^3$ and $R^4$ are methyl groups and n is equal to 1.

Preferably, the alpha-(alkoxy)silane compounds have an average molecular weight of 2,000 to 50,000 g/mol, especially preferably about 10,000 to 20,000 g/mol.

Alpha-(alkoxy)silane compounds are commercially available under the brand name GENIOSIL® from the company Wacker Chemie AG. The production of alpha-(alkoxy)silanes is also known from the patent DE 10 2007 042 948 A1 which is incorporated by reference.

Alpha-(alkoxy)silanes on the basis of polyolefins are unsuitable, however, because it is not possible to form stable, liquid mixtures with the other components at room temperature.

Component (B): Radiation-Curing Compounds

The radiation-curing compounds of component (B) preferably have 1 to 5 radiation-induced, radically polymerizable groups such as acrylic esters, acryl amides, methacrylic esters, methacry lamides, vinyl ethers and bismaleimides.

In an especially preferred embodiment, the component (B) comprises (meth)acrylic esters. Monofunctional as well as difunctional or polyfunctional (meth)acrylic esters can be used. Such (meth)acrylates comprise for example esters of acrylic acid or methacrylic acid with aromatic, aliphatic or cycloaliphatic polyols or polyether alcohols.

For example, esters of (meth)acrylic acid with monovalent alcohols can be used as monofunctional (meth)acrylates. These can be, for example, aliphatic and/or aromatic alcohols with one OH group. The number of C-atoms can be between 1 and 30. Examples of such alcohols include methanol, ethanol, propanol, butanol, hexanol, octanol, decanol, or their isomers, alkyl phenols such as nonyl phenols, monofunctional, low-molecular-weight polyethers such as unilaterally etherified polyethylene, polypropylene and polybutylene with up to 10 repetitive units. Such alcohols can be reacted with (meth)acrylic acid to form the corresponding esters with methods known to those skilled in the art. Examples of such compounds include 2-ethylhexyl(meth)acrylate, octyl-/decyl(meth)acrylate, isobornyl(meth)acrylate, 3-methoxybutyl(meth)acrylate, 2-phenoxyethyl(meth)acrylate, benzyl(meth)acrylate, 2-methoxypropyl(meth)acrylate, isophoryl acrylate, dicyclopentenyl acrylate or dicyclopentenyloxyethyl acrylate.

To produce polyfunctional (meth)acrylates a wide range of polyols can be used, for example, aliphatic polyols with 2 to 4 OH groups per molecule and 2 to about 30 C-atoms. Suitable aliphatic polyols include, in particular, ethylene glycol, 1,2-propandiol or 1,3-propandiol, 1,4-butanediol, 1,3-butanediol, 2,3-butanediol, 1,4-butenediol, 1,5-pentanediol, pentenediols, 1,6-hexanediol, 1,8-octanediol, dodecanediol and higher homologues, isomers and mixtures of such compounds. Higher functional alcohols are also suitable such as glycerol, trimethylol propane, pentaerythrite or sugar alcohols such as sorbite or glucose as well as oligomeric ethers or reaction products with ethylene oxide or propylene oxide. The reaction products of polyfunctional, low-molecular-weight alcohols with alkylene oxides, so-called polyether polyols, can be used as polyol component to produce the (meth)acrylates. The alkylene oxides preferably have two to around four C-atoms. Suitable compounds include, for example, the reaction products of ethylene glycol, propylene glycol, glycerol, trimethylol ethane, trimethylol propane and pentaerythrite with ethylene oxide, propylene oxide or butylene oxide or mixtures thereof.

Examples for such (meth)acrylates include neopentyl glycol di(meth)acrylate, 1,8-octanediol di(meth)acrylate, butanediol di(meth)acrylate, 1,6-hexanediol di(meth)acrylate, trimethylolpropane tri(meth)acrylate, pentaerythrite tetra(meth)acrylate as well as (meth)acrylic esters of sorbite and other sugar alcohols, ethylene oxide-modified neopentyl glycol di(meth)acrylate, ethylene oxide-modified 1,6-hexandiol di(meth)acrylate, polypropylene glycol di(meth)acrylate, pentaerythritol tri(meth)acrylate, dipentaerythritol tetra(meth)acrylate, tris[(meth)acryloxyethyl]isocyanurate, polyethyleneglycol di(meth)acrylates or mixtures thereof.

Especially suitable are reaction products on the basis of polyetherpolyols or polyalkylenediols with (meth)acrylic acid with a molecular weight (MN) of 200 to 8000 g/mol, preferably of 300 to 6000 g/mol, in particular of about 1000 to 3000 g/mol.

A further group of suitable compounds with (meth)acrylic groups are polyurethane(meth)acrylates. These compounds are reaction products of alcohols, in particular monoalcohols, diols and/or triols with di- or tri-isocyanates. The quantity ratios must be selected in such a way that terminal NCO-functionalized oligomers are generated. The polyurethane prepolymers obtained in this way are preferably linear, i.e. produced mainly from monoalcohols or diols and di-isocyanates. It is also possible to use small proportions of trifunctional polyols or isocyanates. Such polyurethane oligomers can then be reacted with OH-reactive (meth)acrylic compounds to form suitable functionalized polyurethane oligomers.

The monomeric di- or tri-isocyanates known for adhesive applications can be used as the starting compound. Examples of suitable monomeric polyisocyanates include 1,5-naphthylene di-isocyanate, 2,2'-, 2,4'- and/or 4,4'-diphenylmethane di-isocyanate (MDI), hydrogenated MDI (H12MDI), xylylene di-isocyanate (XDI), tetramethylxylylene di-isocyanate (TMXDI), 4,4'-diphenyldimethylmethane di-isocyanate, 4,4'-dibenzyl di-isocyanate, 1,3-phenylene di-isocyanate, 1,4-phenylene di-isocyanate, toluylene di-isocyanate (TDI), 1-methyl-2,4-di-isocyanato-cyclohexane, 1,6-di-isocyanato-2,2,4-trimethyl hexane, 1-isocyanatomethyl-3-isocyanato-1,5,5-trimethylcyclohexane (IPDI), tetramethoxybutane-1,4-di-isocyanate (HDI), dicyclohexylmethane di-isocyanate, cyclohexane-1,4-di-isocyanate, ethylene di-isocyanate, trimethylhexamethylene di-isocyanate, 1,4-di-isocyanatobutane, 1,12-di-isocyanatododecane, dimer fatty acid di-isocyanate or uretdione, biuret or isocyanurates of di-isocyanates.

Suitable polyols for such PU oligomers include, for example, low-molecular-weight oligomers selected from polyester polyols, polyether polyols, polycarbonate polyols and polyacetate polyols which have terminal OH groups, or aliphatic or aromatic alcohols with a valency of one to three and a molecular weight ($M_N$) of preferably about 200 to 2000 g/mol (number-averaged molecular weight $M_N$, as determined by GPC), in particular up to 1000 g/mol. Such polyols are known to those skilled in the art and commercially available.

The polyols can be reacted with the polyisocyanates in the familiar way, for example in the presence of solvents. It is preferable, however, to work without solvents. To accelerate the reaction, the temperature is usually increased, for example to 40 to 80° C. As necessary, the usual catalysts used in polyurethane chemistry can be added to the reaction mixture to accelerate the reaction.

In a further reaction all NCO groups are then reacted with compounds which carry a functional group which can react with isocyanates and which have a double bond cross-linkable by radical polymerization as a further functional group. These compounds generally have a maximum molecular weight of 1000 g/mol.

Examples of such compounds include esters and amides of α-β-unsaturated carboxylic acids with low-molecular-weight, in particular aliphatic, alcohols which carry a further OH group in the alkyl residue. Esters and amides with the corresponding OH groups include, for example, 2-hydroxyethyl(meth)acrylamide, 2-hydroxyethyl(meth)acrylate, 2-hydroxypropyl(meth)acrylate, 3-hydroxypropyl(meth)acrylate, 3-hydroxypropyl(meth)acrylamide, N-hydroxymethyl(meth)acrylamide, reaction products of glycidyl ethers or glycidyl esters with acrylic or methacrylic acid, partial transesterification products of polyalcohols such as pentaerytherite, glycerol or trimethylol propane with (meth) acrylic acid.

Monomers, polymers or oligomers which contain up to 5 radiation-reactive groups are suitable as a radiation-curing compound. The radiation-curing compound is preferably in the form of oligomers or monomers which carry 1 to 3 radiation-reactive groups, or, optionally, as a mixture of such oligomers, monomers, or polymers.

Acid amides are also suitable, for example: acrylamide, N-methylacrylamide, N-methylmethacrylamide, N,N-dimethylacrylamide, N,N-dimethylmethacrylamide, N-ethylmethacrylamide, N,N-diethylacrylamide, N,N-diethylmethacrylamide, N-isopropylacrylamide, N-buthylacrylamide, N-buthylmethacrylamide, N-t-butylacrylamide, N,N-dibutylmethacrylamide, N-phenylacrylamide, N-(acryloyl)morpholine, N-(acryloyl)piperidine, N-(methacryloyl)piperidine, N-(1,1-dimethyl-3-oxobutyl) acrylamide, N-1,1,3,3-tetramethylbutylacrylamide, dimethylene-bis-(meth)acrylamide, tetramethylene-bis-(meth)acrylamide, trimethylhexamethylene-bis-(meth)acrylamide, tri(meth)acryloyldiethylenetriamine and similar compounds.

Vinyl ethers, maleimides and bismaleimides are also suitable. Typical examples of vinyl ether-containing monomers are methylvinylether, ethylvinylether, hydroxybutyl vinylether, tert-butyl vinylether, isobutylvinyl ether, triethyleneglycol divinylether (available under the brand name RAPI-CURE™ DVE-3" from International Specialty Products, Wayne, N.J.), 1,4-cyclohexane dimethanol divinylether (RAPI-CURE CHVE, International Specialty Products), trimethylolpropan trivinylether (TMPTVE, available from BASF Corp., Mount Olive, N.J.), divinylether resins, available under the brand name "VECTOMER"® from Morflex, Greensboro, N.C. (for example VECTOMER 2010, VECTOMER 2020, VECTOMER 4010 and VECTOMER 4020) and similar materials from other manufacturers and mixtures thereof.

Preferred maleimides that can be used in the present invention correspond to the following general formula (II) or are isomers and precursors thereof:

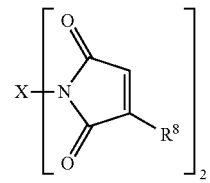

wherein
each $R^8$ is selected independently from hydrogen and $C_1$-$C_{12}$ alkyl and
X is a multivalent residue selected from the group consisting of branched-chain alkylene or alkylene oxide residues having about 12 to about 500 carbon atoms in the backbone, and aromatic groups comprising the structure:

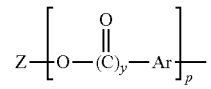

wherein
p is equal to 1, 2 or 3
y is equal to 0 or 1
each Ar is, independently, a mono-substituted or tri-substituted aromatic or heteroaromatic ring having 3 to 10 carbon atoms and
Z is a branched-chain alkylene or alklylene oxide group having about 12 to about 500 carbon atoms in its backbone,
and including mixtures thereof.

Component (C): Photoinitiators for the Radical Polymerization

The usual commercially available compounds can be used as photoinitiators for the radical polymerization, including for example α-hydroxyketones, benzophenone, α-α-diethoxyacetophenone, 4,4-diethylaminobenzophenone, 2,2-dimethoxy-2-phenylacetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoin, benzoinethylether, benzoinisopropylether, benzoinisobutylether, 2-hydroxy-2-methyl-1-phenylpropane-1-on, 2-isopropylthioxanthone, dibenzosuberone, 2,4,6-trimethylbezoyldiphenylphosphine oxide and bisacylphosphine oxide, wherein the photoinitiators can be used alone or in combination of two or more of the compounds mentioned.

The IRGACURE® types from Ciba Speciality Chemicals can be used as UV photoinitiators, for example the types IRGACURE® 184, IRGACURE® 500, IRGACURE® 1173, IRGACURE® 2959, IRGACURE® 745, IRGACURE® 651, IRGACURE® 369, IRGACURE® 907, IRGACURE® 1300, IRGACURE® 819, IRGACURE® 819DW, IRGACURE® 2022, IRGACURE® 2100, IRGACURE® 784 and IRGACURE® 250. The DAROCUR® types from Ciba Speciality Chemicals can also be used, for example the types DAROCUR® MBF, DAROCUR® 1173, DAROCUR® TPO and DAROCUR® 4265.

Component (D): Catalysts for the Silane Curing

Both acids and bases are suitable as catalysts for the acceleration of the silane curing on exposure to moisture.

The catalysts are preferably selected from the group consisting of inorganic and organic acids, aliphatic primary, secondary and tertiary monoamines, diamines and polyamines, amidines, aldimines, ketimines, enamines, oxazolidines and heavy metal-containing metallo-organic compounds.

Suitable acids are, for example, carboxylic acids such as acrylic acid, methacrylic acid, diacrylic acid, maleic acid, itaconic acid and acetic acid, organosulfonic acids such as trifluormethanesulfonic acid and toluolsulfonic acid as well as inorganic acids such as phosphoric acids and phosphoric acid esters, hydrochloric acid and boric acid.

Organic compounds containing amino groups can be used as bases, for example aliphatic primary, secondary and tertiary monoamines, diamines and polyamines, aromatic amines, cyclic and heterocyclic amines as well as aminosilanes, but also amidines and latent amines such as aldimines, ketimines, enamines and oxazolidines. Non-exclusive examples include butylamine, ethylene diamine, bibutylamine, triethylamine, N,N-bis-(N,N-dimethyl-2-aminoethyl)-methylamine, triethanolamine, cyclohexylamine, N,N-dimethylcyclohexylamine, benzylamine, 3-aminopropyltrimethoxysilane, N-(2-aminoethyl)-3-aminopropyltrimethoxysilane (DAMO), cyclohexylaminomethyltrimethoxysilane, aniline, diphenylamine, N,N-dimethylphenylamine, piperidines such as 2,2,6,6-tetramethyl piperidine, piperazines, morpholines such as N-ethylmorpholine and morpholine, 1,4-diazabicyclo[2.2.2]octane (DABCO), guanidines such as tetramethyl guanidine, 1,8-diazabicyclo[5.4.0]undec-7-en (DBU), 1,5-diazabicyclo[4.3.0]non-5-en (DBN), dicyane diamide, pyrimidines, aminopyrimidines, imidazolines, imidazols, biguanides and tetramethyliminodiisopropylamine.

Organic heavy metal compounds can also be used as catalysts, for example carboxylates or other organic compounds of lead, iron, titanium, zinc, tin, bismuth, cobalt, zirconium, vanadium and nickel. Non-exclusive examples include dibutyl tin dilaurate (DBTL), dibutyl tin diacetate, dibutyl tin oxide, tetrabutyl titanate, iron acetyl acetonate, cobalt naphthenate and lead dioctoate.

The simultaneous use of acids and bases in a composition is also possible. Especially rapid curing reactions by means of humidity can be achieved in this way without causing any instability in the composition.

The compositions in accordance with the invention are preferably free of heavy metals. It is especially preferable to dispense with the use of tin-containing catalysts as component (D). From a toxicological point of view, the use of compositions containing heavy metals and particularly tin is subject to increasing criticism.

Component (E): Further Modifiers

The compositions in accordance with the invention can also contain one or more additional modifiers as a further constituent. The modifiers are preferably selected from the group of fillers, dyes, pigments, fluorescents, stabilizers, moisture scavengers, accelerators, bonding agents, crosslinkers, plasticizers, wetting agents, thixotropic agents, thinners, flexibiliers, polymeric thickeners, flame retardants, corrosion inhibitors, softeners and tackifiers.

Component (F): Silane-Based Modifiers

The composition in accordance with the invention can also contain further silane-based modifiers to support moisture curing which are not alpha-alkoxysilane compounds. The silane-based modifiers preferably correspond to the general formula (III):

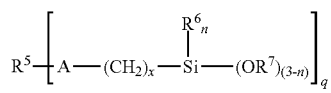

wherein $R^5$ is a linear or branched polymeric backbone with a valency of two to nine, for example a polyether, polyamide, polyester, polycarbonate, polyurethane, polyurea or polyacrylate, each $R^6$ is, independently, a monovalent residue selected from the group consisting of linear, branched or cyclic, saturated, unsaturated and aromatic hydrocarbons which optionally can be halogen-substituted or interrupted by 1 to 3 heteroatoms, each $R^7$ is, independently, hydrogen or a monovalent residue selected from the group of linear, branched or cyclic, saturated, unsaturated and aromatic hydrocarbons which optionally can be halogen-substituted or interrupted by 1 to 3 heteroatoms, A is a heteroatom-containing residue with a valency of 2 or 3 which is bound by a heteroatom, for example oxygen, nitrogen or sulfur to the group $-(CH_2)_x-SiR^6{}_n(OR^7)_{(3-n)}$, n is equal to 0-2 q is equal to 2-9 and x is equal to 2-5.

The heteroatom-containing residue A preferably has the properties cited for the component (A). $R^6$ is preferably $C_1$-$C_6$ alkyl, in particular methyl or ethyl, or phenyl.

The residue $R^7$ is preferably a methyl or ethyl group, n is preferably 0 or 1, and x is preferably 3.

In accordance with a special embodiment of the invention, the compositions described above are used to laminate different layers in electro-optical components, e.g. displays. Such components are manufactured in very high quantities in fully automated processes. The rational production of these components demands that the cured reactive compositions reach an initial hardness very quickly so that the components can be immediately passed on to the next production step.

The compositions in accordance with the invention can be exposed to light through the transparent part of a display and are cured there within just a few seconds. Any state of the art lamp can be used. The compositions are distinguished by excellent transparency and are not inclined to turn yellow when exposed to temperature and moisture. However, the electro-optical components usually have a frame around the edges through which light cannot pass and which thus forms a shadow zone.

In this shadow zone the composition in accordance with the invention is not cured by exposure to light. The compositions in accordance with the invention are, however, largely cured after a few hours due to the penetration of moisture into these areas. This prevents the composition from degassing or from flowing into other areas, which would reduce the service life of the electro-optical components.

The invention is illustrated in the following on the basis of preferred embodiment examples with reference to the drawings, which should not, however, be regarded as limiting examples.

DETAILED DESCRIPTION OF THE INVENTION

Figure 1:
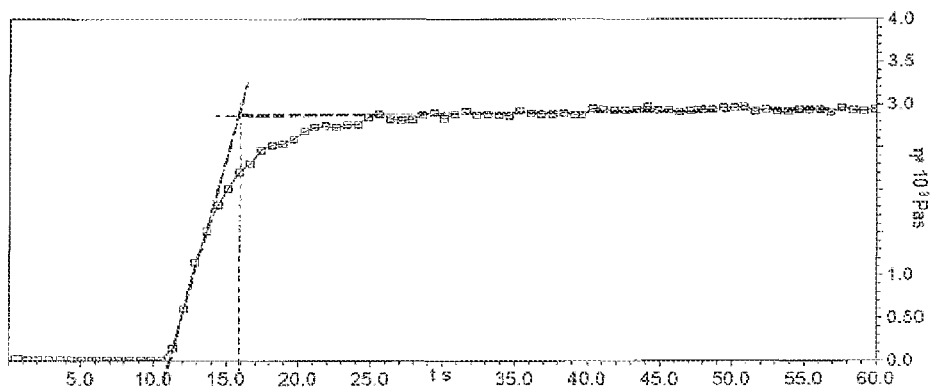
FIG. 1 shows a rheometer graph to calculate the curing time on exposure to light of the composition in accordance with comparative example 1.

In the following examples "moisture" is defined as 20% relative humidity at 23.5° C., or the moisture on substrate surfaces under these conditions.

Exposure to light means irradiation with a DELOLUX 04 discharge lamp from the company DELO with an intensity of 55±3 mW/cm².

Room temperature is 23.5° C.±2° C.

"Cross-linking" or "curing" are defined as a polymerization or condensation reaction beyond the gel point.

To produce the dual curing, single-component compositions, the raw materials were mixed in dry air, with the catalysts being added as the last step. The polyurethane acrylates used were supplied by Japan U-PICA Co., Ltd., the alkoxysilanes of the type GENIOSIL® by Wacker Chemie AG, the silane-grafted polyolefin Vestoplast® EP2403 by Evonik Industries AG, and the oxazolidine Incozol® 2 by Incorez Ltd.

The composition of the formulations produced in this way is set out in the following table.

|  | Comparative Example 1 | Comparative Example 2 | Example 1 | Example 2 |
|---|---|---|---|---|
| U-Pica 180 | 60.6 | 60.6 | 60.6 | — |
| U-Pica 300 | — | — | — | 60.97 |
| Geniosil STP-E10 | — | — | 30 | 30 |
| Geniosil STP-E15 | 30 | — | — | — |
| Vestoplast EP2403 | — | 30 | — | — |
| Irgacure 184 | 3 | 3 | 3 | 3 |
| VTMO | 6 | 6 | 6 | 6 |
| Geniosil XL 63 | — | — | — | — |
| Acrylic acid | — | — | — | — |
| DAMO | 0.4 | 0.4 | 0.4 | — |
| DBU | — | — | — | 0.03 |
| TMG | — | — | — | — |
| Incozol 2 | — | — | — | — |
| Reactivity Light curing [s] | 6 | n/a | 5 | 13 |
| Skin-formation time | >2 days | n/a | 75 min | 60 min |
| Curing depth/24 h [mm] | 0.0 | n/a | 1.3 | 2.0 |
| Viscosity [mPas] | 7,000 | n/a | 8,800 | 26,500 |
| Viscosity [mPas] after 3 d storage at 50° C. | n/a | n/a | 8,300 | 26,400 |
| Visual assessment | Colorless/clear | Pasty/cloudy, inhomogenous | Colorless/clear | Colorless/clear |

|  | Example 3 | Example 4 | Example 5 | Example 6 |
|---|---|---|---|---|
| U-Pica 180 | — | — | — | — |
| U-Pica 300 | 60.9 | 61.5 | 60 | 61 |
| Geniosil STP-E10 | 30 | 30 | 30 | 30 |
| Geniosil STP-E15 | — | — | — | — |
| Vestoplast EP2403 | — | — | — | — |
| Irgacure 184 | 3 | 3 | 3 | 3 |
| VTMO | 6 | 1 | 6 | — |
| Geniosil XL 63 | — | 1.5 | — | 3 |
| Acrylic acid | — | 3 | — | 3 |
| DAMO | — | — | — | — |
| DBU | — | — | — | — |
| TMG | 0.1 | — | — | — |
| Incozol 2 | — | — | 1 | — |
| Reactivity Light curing [s] | 12 | 3 | 11 | 3 |
| Skin-formation time | 60 min | 315 min | 270 min | 510 min |
| Curing depth/24 h [mm] | 2.1 | 3.1 | 0.8 | 2.5 |
| Viscosity [mPas] | 26,500 | 38,000 | 23,000 | 10,200 |
| Viscosity [mPas] after 3 d storage at 50° C. | 26,500 | 42,000 | 30,160 | 13,100 |
| Visual assessment | Colorless/clear | Colorless/clear | Colorless/clear | Colorless/clear |

The abbreviations used in the table have the following meanings:
VTMO vinyl trimethoxy silane
DAMO N-(2-aminoethyl)-3-aminopropyl trimethoxy silane
DBU 1,8-diazabicyclo[5.4.0]unddec-7-ene
TMG 1,1,3,3-tetramethyl guanidine
n/a non-applicable The adhesive compositions in accordance with the invention, which contain alpha-(alkoxy)silane compounds, can be cross-linked within a few minutes to hours by reaction with the moisture in the air by means of an amine catalyst, but without the use of additional heavy metal catalysts. Comparative example 1 shows that the corresponding compositions with gamma-(alkoxy)silane compounds take much longer for this.

Alpha-(alkoxy)silane-modified polyolefins (comparative example 2) cannot, however, be processed with acrylates to form storage-stable, homogenous, liquid, reactive adhesives.

Example 4 shows that the use of acids as a catalyst for the cross-linking of alpha-(alkoxyl)silane-functionalized prepolymers also allows a skin-formation time of just a few hours with a good curing depth.

The use of moisture-sensitive, latent amines allows good processing stability as shown in example 5 by means of the comparatively low viscosity of the liquid adhesive composition.

Figure 2:
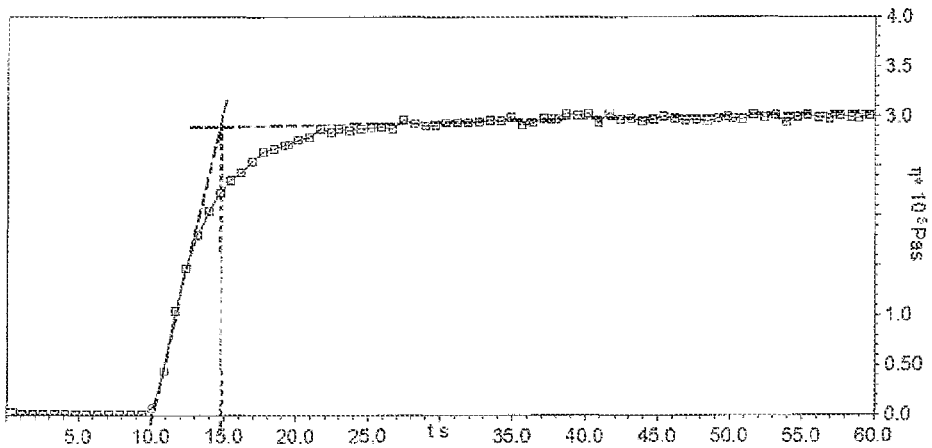
FIGS. 2 to 7 show rheometer graphs on exposure to light for the examples 1 to 6 in accordance with the invention6.
Figure 3:
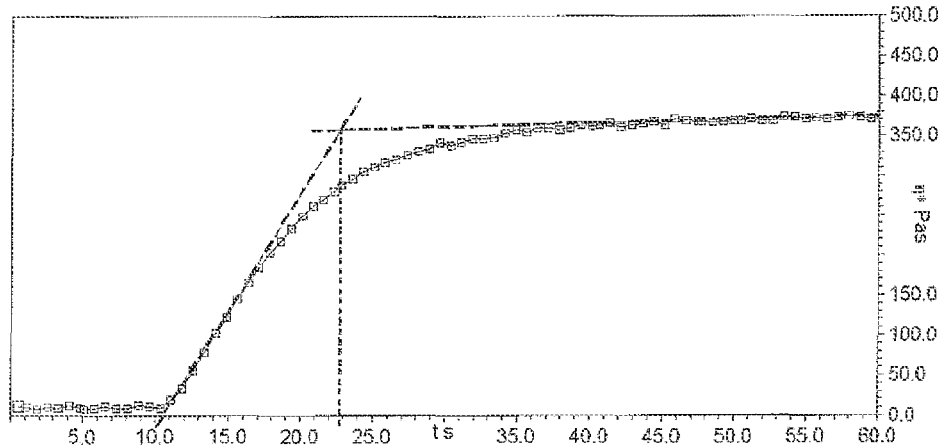
Figure 4:
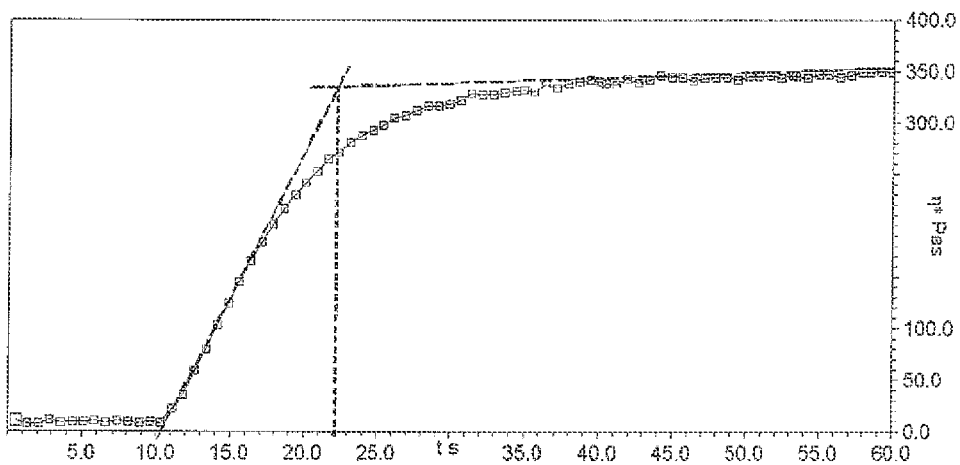
Figure 5:
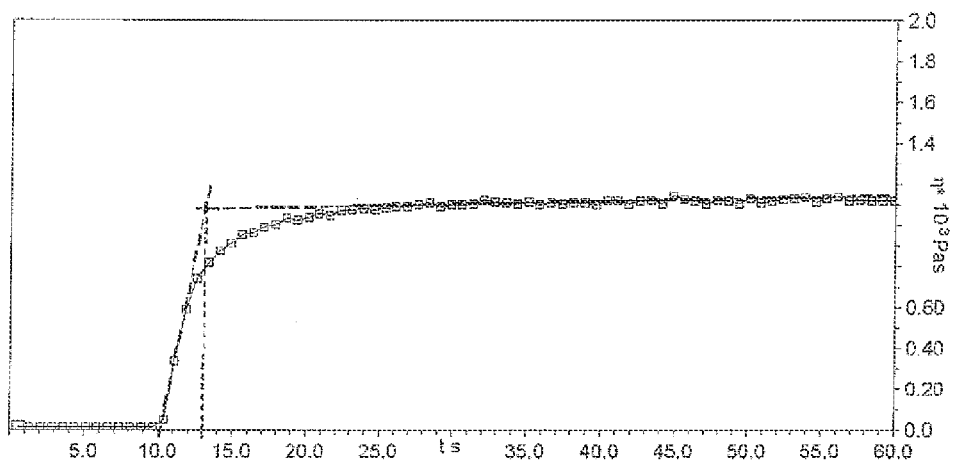
Figure 6:
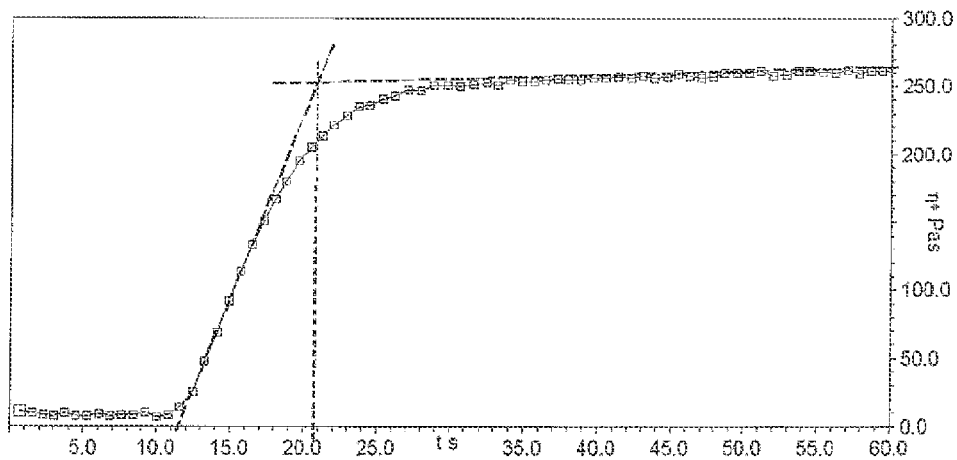
Figure 7:
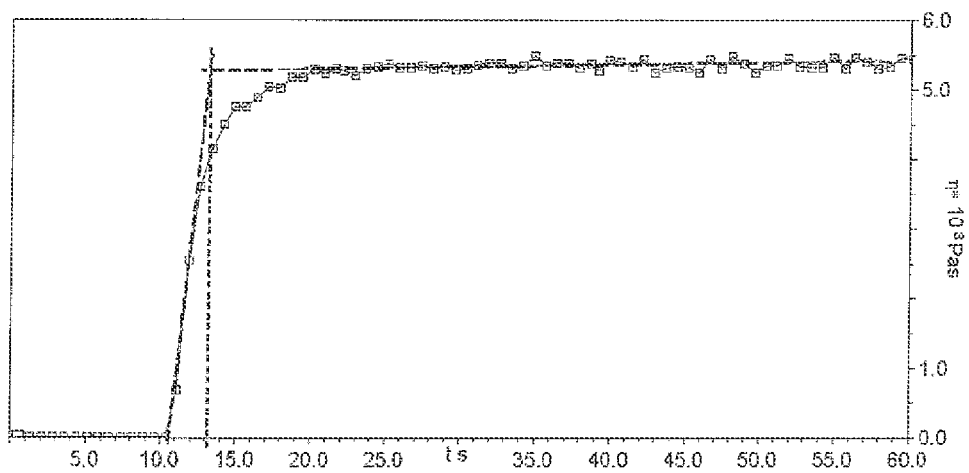

The reactivity of the compositions on exposure to light was measured using a Bohlin CS-rheometer CVO PP 9 with a photorheology device and a DELOLUX 04 discharge lamp. Exposure to light started 10 seconds after measurement started. The reaction time is defined as the time value at the intersection of the tangents of the maximum rise and the end viscosity. The system was set with a light intensity of 55±3 mW/cm², a continuous oscillation of 10 Hz, a temperature of 23.5° C., a layer thickness of 100 μm and a nominal deformation of 5%. FIGS. 1 to 7 show the measured viscosity values over the time for the various examples.

The skin formation times were determined at a relative humidity of 20±1% and a temperature of 23.5° C. by testing the surface with a spatula. For this purpose, 2 g of the composition was poured into a square mould with sides of 3 cm. The skin formation time is the time value at which no threading is observed on contact with the surface.

To determine the curing depth within 24 hours, 6 g of the composition was poured into a cylindrical vessel of polyethylene with an internal diameter of 2.2 cm at a relative humidity of 20±1% and a temperature of 23.5° C. After 24 hours the cross-linked layer was removed from the liquid composition and the mean thickness measured.

The complex viscosity was measured with a rheometer Physica MCR301 from Anton Paar with a standardized measurement cone CP20-1 at 23.5° C., and determined at a shear rate of 1/second. To assess the storage stability, the viscosity measurement was repeated at room temperature after three days storage of the compositions at 50° C. in the dark. The compositions are regarded as storage-stable until the viscosity has doubled under the storage conditions.

The compositions in accordance with the invention thus constitute storage-stable reactive adhesives which cure quickly and with a high initial solidity on exposure to light, and at a speed sufficient for industrial production processes on exposure to moisture in unexposed shadow zones.

The invention claimed is:

1. A single-component, dual curing composition which is liquid at room temperature and can be cross-linked by actinic radiation and by moisture, consisting of
    (A) 5 to 80 parts by weight of at least one alpha-(alkoxy)silane compound having one to four alpha-(alkoxy)silane groups, but with the exception of polyolefins substituted with alpha-(alkoxy)silane groups;
    (B) 5 to 80 parts by weight of at least one radiation-curing compound having 1-5 radiation-induced, radically polymerizable groups, whereby components (A) and (B) are present as separate compounds;
    (C) 0.01 to 20 parts by weight of at least one photoinitiator for radical polymerization;
    (D) 0.001 to 20 parts by weight of at least one catalyst for silane curing by moisture, selected from the group consisting of inorganic and organic acids, aliphatic primary, secondary and tertiary monoamines, diamines and polyamines, amidines, aldimines, ketimines, enamines, oxazolidines and the heavy metal-containing metalloorganic compounds, and mixtures thereof;
    (E) 0 to 70 parts by weight of at least one modifier, selected from the group consisting of fillers, dyes, pigments, fluorescents, stabilizers, moisture scavengers, accelerators, bonding agents, cross-linkers, plasticizers, wetting agents, thixotropic agents, thinners, flexibilizers, polymeric thickeners, flame retardants, corrosion inhibitors, softeners and tackifiers, alone or in combination with each other; and
    (F) 0 to 30 parts by weight of a silane-based modifier of general formula (III)

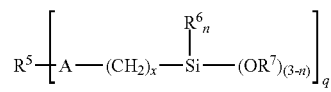

wherein
$R^5$ is a linear or branched polymeric backbone with a valency of two to nine, such as a polyether, polyamide, polyester, polycarbonate, polyurethane, polyurea or polyacrylate,
each $R^6$ is, independently, a monovalent residue selected from the group consisting of linear, branched or cyclic, saturated, unsaturated and aromatic hydrocarbons which optionally can be halogen-substituted or interrupted by 1 to 3 heteroatoms,
each $R^7$ is, independently, hydrogen or a monovalent residue selected from the group consisting of linear, branched or cyclic, saturated, unsaturated and aromatic hydrocarbons which optionally can be halogen-substituted or interrupted by 1 to 3 heteroatoms,
A is a heteroatom-containing residue having a valency of 2 or 3 which is bound by a heteroatom, such as oxygen, nitrogen or sulfur to the group $-(CH_2)_x-SiR^6{}_n(OR^7)_{(3-n)}$,
n is equal to 0-2
q is equal to 2-9 and
x is equal to 2-5
wherein the sum of all parts by weight is 100.

2. Composition as claimed in claim 1, wherein at least one alpha-alkoxysilane compound corresponds to the following formula (I):

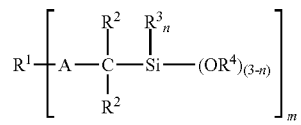

wherein
$R^1$ is a residue with a valency of one to four selected from the group consisting of (i) linear or branched, saturated or unsaturated alkyl residues having 1 to 8 C-atoms optionally interrupted by 1 to 3 heteroatoms, (ii) saturated or unsaturated cycloalkyl residues having 3-9 C-atoms optionally interrupted by 1 to 3 heteroatoms, (iii) aromatic residues with 5 to 10 C-atoms, (iv) polyether, polyamide, polyester, polycarbonate, polyurethane, polyurea and polyacrylate, wherein $R^1$ can be unsubstituted or substituted but does not carry any radiation-curing groups,
each $R^2$ is, independently, a monovalent residue selected from the group consisting of hydrogen, linear, branched, cyclic, saturated, unsaturated and aromatic hydrocarbons, which optionally can be halogen-substituted and/or interrupted by 1 to 3 heteroatoms,
each $R^3$ is, independently, a monovalent residue selected from the group consisting of linear, branched, cyclic, saturated, unsaturated and aromatic hydrocarbons, which optionally can be halogen-substituted or interrupted by 1 to 3 heteroatoms,
each $R^4$ is, independently, a monovalent residue selected from the group consisting of hydrogen, linear, branched, cyclic, saturated, unsaturated and aromatic hydrocarbons, which can be optionally halogen-substituted or interrupted by 1 to 3 heteroatoms,
A is a heteroatom-containing residue with a valency of 2 or 3 which is bound by a heteroatom to the group $-CR^2{}_2-SiR^3{}_n(OR^4)_{(3-n)}$,
m equals 1 to 4, and
n equals 0 to 2.

3. Composition as claimed in claim 2, wherein $R^4$ is a methyl or ethyl group and n is equal to 0 or 1.

4. Composition as claimed in claim 2, wherein $R^2$ is hydrogen, $R^3$ and $R^4$ are methyl groups and n is equal to 1.

5. Composition as claimed in claim 2, wherein A in general formula (I) is a carboxy, carbamate, carbonate, ureido, urethane or sulfonate bond, or an oxygen or nitrogen atom.

6. Composition as claimed in claim 2, wherein $R^1$ is a polyethylene glycol or polypropylene glycol residue.

7. Composition as claimed in claim 1, wherein the radiation curing compound contains acrylic ester groups, acrylamide groups, methacrylic ester groups, methacrylamide groups or mixtures thereof.

8. Composition as claimed in claim 1, wherein the catalyst for the silane cross-linking comprises an oxazolidine.

9. Composition as claimed in claim 1, wherein the catalyst for the silane cross-linking is free of heavy metals.

10. Composition as claimed in claim 1, wherein the composition is cross-linked in unexposed zones by humidity at room temperature within 24 hours.

11. Composition as claimed in claim 1, wherein the composition is cured within less than one minute on exposure to light.

12. A composition as claimed in claim 1 being operable as an adhesive or sealant for the bonding, filling, sealing and coating of substrates.

13. A composition as claimed in claim 12 being configured for electro-optical components.

14. A composition as claimed in claim 1 being operable as an adhesive or sealant for the fixation or filling of components, whereby the components have at least one shadow zone or capillary gaps in which pure radiation curing is not possible due to insufficient exposure to light.

15. A component comprising the composition as claimed in claim 1, wherein the composition is cured by exposure to actinic radiation and moisture.

16. The composition as claimed in claim 9 wherein the catalyst for the silane cross-linking is free of tin.

* * * * *